US012695862B2

(12) United States Patent
Kim et al.

(10) Patent No.: US 12,695,862 B2
(45) Date of Patent: Jul. 28, 2026

(54) CONTROLLER OF CAMERA MODULE, DEVICE FOR MEASURING FREQUENCY RESPONSE OF CAMERA MODULE AND METHOD THEREOF

(71) Applicants: LX SEMICON CO., LTD., Daejeon (KR); LG INNOTEK CO., LTD., Seoul (KR)

(72) Inventors: Kyu Ho Kim, Daejeon (KR); Seung Jun Choi, Daejeon (KR); Jin Kook Yun, Daejeon (KR); Young Seop Moon, Seoul (KR); Eun Mi Kim, Seoul (KR)

(73) Assignees: LX SEMICON CO., LTD., Daejeon (KR); LG INNOTEK CO., LTD., Seoul (KR)

( * ) Notice: Subject to any disclaimer, the term of this patent is extended or adjusted under 35 U.S.C. 154(b) by 112 days.

(21) Appl. No.: 18/726,088

(22) PCT Filed: Dec. 29, 2022

(86) PCT No.: PCT/KR2022/021670
§ 371 (c)(1),
(2) Date: Jul. 1, 2024

(87) PCT Pub. No.: WO2023/128678
PCT Pub. Date: Jul. 6, 2023

(65) Prior Publication Data
US 2025/0071256 A1 Feb. 27, 2025

(30) Foreign Application Priority Data
Dec. 31, 2021 (KR) ........................ 10-2021-0194508

(51) Int. Cl.
*H04N 17/00* (2006.01)
*G01D 5/14* (2006.01)
(Continued)

(52) U.S. Cl.
CPC ........... *H04N 17/002* (2013.01); *G01D 5/142* (2013.01); *H04N 23/667* (2023.01); *H04N 23/6812* (2023.01); *H04N 23/687* (2023.01)

(58) Field of Classification Search
CPC .............. H04N 17/002; H04N 23/667; H04N 23/6812; H04N 23/687; G01D 5/142
(Continued)

(56) References Cited

U.S. PATENT DOCUMENTS

2015/0281581 A1 10/2015 Sakurai et al.
2020/0177815 A1 6/2020 Kim et al.
(Continued)

FOREIGN PATENT DOCUMENTS

JP 2006-38758 A 2/2006
JP 4193235 B2 12/2008
(Continued)

OTHER PUBLICATIONS

International Search Report issued for International Application No. PCT/KR2022/021670 on Apr. 7, 2023, 4 pages.

*Primary Examiner* — Joel W Fosselman
(74) *Attorney, Agent, or Firm* — ROTHWELL, FIGG, ERNST & MANBECK, P.C.

(57) ABSTRACT

The present invention relates to a controller of a camera module capable of simplifying a measurement system and reducing cost by having a frequency response measurement function.
A controller of camera module according to an embodiment, in a driving mode, preprocesses an actuator position value signal sensed by a Hall sensor to output to a measurement equipment, a target position value, arithmetic processes a target position value, an actuator position value signal and a disturbance signal supplied from the measurement equipment to output an error value signal to the measurement (Continued)

INITIALLY SETTING — S402

INCREASING FREQUENCY OF DISTURBANCE SIGNAL — S404

CONVERTING POSITION VALUE SIGNAL OF ACTUATOR INTO DIGITAL POSITION VALUE Y(n) — S406

CONVERTING ADC INPUT SIGNAL INTO DISTURBANCE SIGNAL AND CONVERTING DISTURBANCE SIGNAL INTO DIGITAL DISTURBANCE VALUE X(n) — S408

ERRO VALUE E(n) = TARGET POSITION VALUE – POSITION VALUE Y(n) OF ACTUATOR – DISTURBANCE VALUE X(n) — S410

CONVERTING ERROT VALUE E(n) INTO ANALOG ERROR VALUE SIGNAL AND OUTPUTTING ANALOG ERROR VALUE SIGNAL — S412

PID CONTROLLING AND DRIVING ACTUATOR — S414

Tn = REF — S416
Yes
No n=n+1 — S418 equipment, and generates an actuator driving signal that compensates for the error value signal to drive an actuator.

17 Claims, 5 Drawing Sheets

(51) Int. Cl.
  *H04N 23/667*            (2023.01)
  *H04N 23/68*             (2023.01)
(58) Field of Classification Search
  USPC ........................................................ 396/55
  See application file for complete search history.

(56)                    References Cited

U.S. PATENT DOCUMENTS

2020/0177816 A1      6/2020  Takeuchi
2021/0195113 A1*     6/2021  Tsubusaki ............ H04N 23/682

FOREIGN PATENT DOCUMENTS

JP          2020-064105  A      4/2020
KR      10-2017-0069060  A      6/2017
KR      10-2017-0119774  A     10/2017
KR          10-1886362  B1      8/2018
KR      10-2020-0114091  A     10/2020

* cited by examiner

FIG. 4

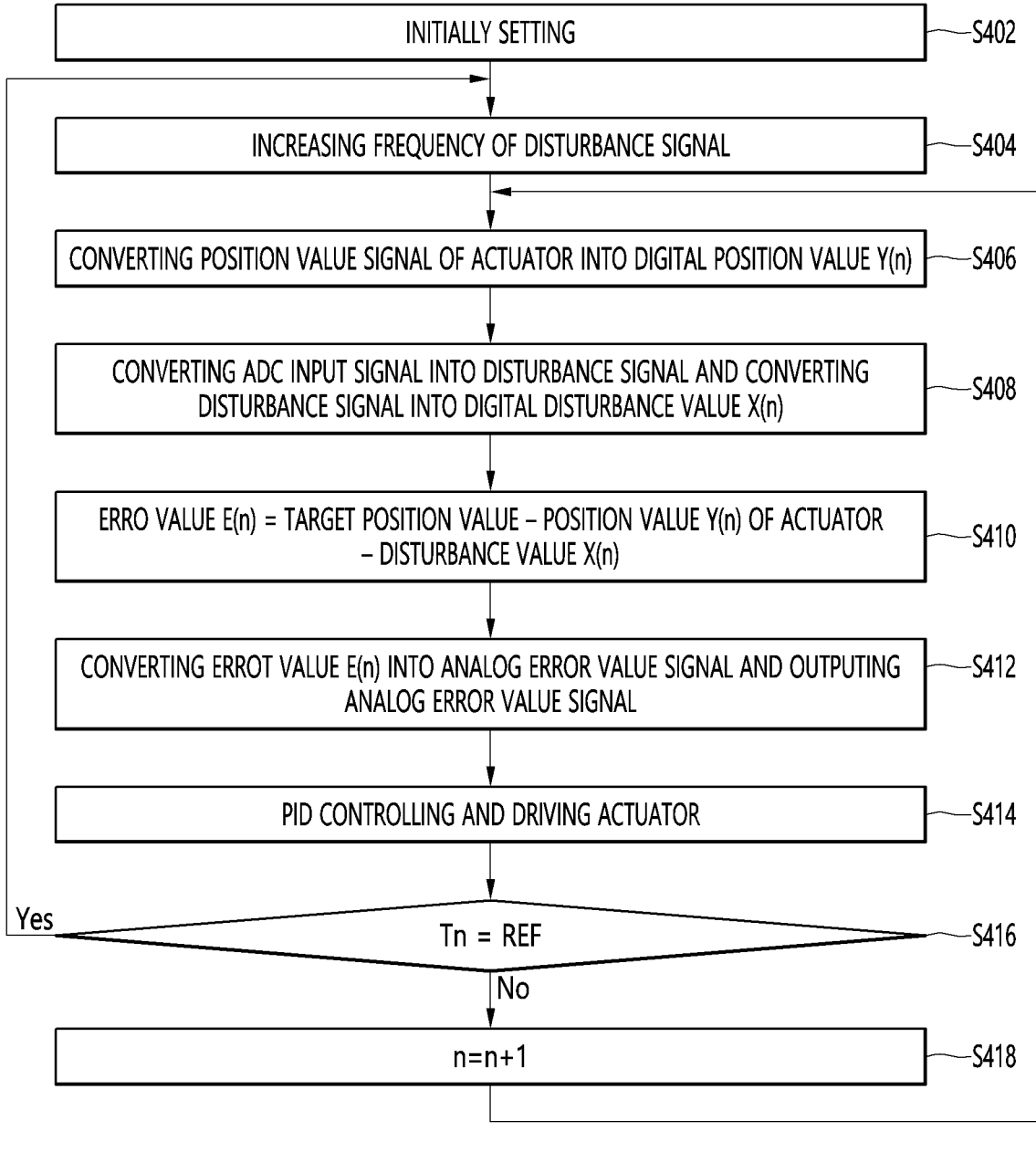

| | |
|---|---|
| INITIALLY SETTING | S402 |
| INCREASING FREQUENCY OF DISTURBANCE SIGNAL | S404 |
| CONVERTING POSITION VALUE SIGNAL OF ACTUATOR INTO DIGITAL POSITION VALUE Y(n) | S406 |
| CONVERTING ADC INPUT SIGNAL INTO DISTURBANCE SIGNAL AND CONVERTING DISTURBANCE SIGNAL INTO DIGITAL DISTURBANCE VALUE X(n) | S408 |
| ERRO VALUE E(n) = TARGET POSITION VALUE – POSITION VALUE Y(n) OF ACTUATOR – DISTURBANCE VALUE X(n) | S410 |
| CONVERTING ERROT VALUE E(n) INTO ANALOG ERROR VALUE SIGNAL AND OUTPUTING ANALOG ERROR VALUE SIGNAL | S412 |
| PID CONTROLLING AND DRIVING ACTUATOR | S414 |
| Tn = REF | S416 |
| n=n+1 | S418 |

Yes

No

CONTROLLER OF CAMERA MODULE, DEVICE FOR MEASURING FREQUENCY RESPONSE OF CAMERA MODULE AND METHOD THEREOF

CROSS REFERENCE TO RELATED APPLICATION(S)

This application is a 35 U.S.C. § 371 National Phase Entry Application from PCT/KR2022/021670, filed on Dec. 29, 2022, which claims the benefit of Korean Patent Application No. 10-2021-0194508, filed on Dec. 31, 2021, the disclosures of which are herein incorporated by reference in their entirety.

BACKGROUND OF THE DISCLOSURE

Field

The present invention relates to a controller of a camera module, and a device and method for measuring a frequency response of a camera module capable of simplifying a measurement system and reducing costs by having a function of measuring a frequency response.

Discussion of the Related Art

A camera module installed in a mobile electronic device such as a smartphone or tablet has a hand-shake prevention function to prevent an image from being shaken by a user's hand shake during shooting.

To prevent hand shake, the camera module uses optical image stabilization (OIS) technology that senses and corrects the movement of the camera module caused by the user's hand shake. The camera module can include a gyroscopic sensor and an OIS controller to offset movement of the camera module.

The camera module needs a tuning process of measuring the frequency response characteristic of the camera module in the inspection step, setting control coefficients of the OIS controller using the measurement results, and storing the set control coefficients in the internal memory.

The frequency response measurement system of the camera module according to the related art must have an external frequency response analysis (FRA) measurement board between the measurement equipment and the OIS controller, and the OIS controller must has an interface circuit for communication with the FRA measurement board circuit.

Thus, the related art has a problem in that the configuration of the measurement system and measurement method for measuring the frequency response characteristic of the camera module are complicated and cost increases.

SUMMARY OF THE DISCLOSURE

The present invention provides a controller of a camera module, a device and method for measuring a frequency response of a camera module capable of simplifying a measurement system and reducing cost by having a frequency response measurement function.

In a controller of the camera module according to an embodiment, wherein in a driving mode, a driving signal is generated to compensate for a difference between a target position using an angle change of the camera module sensed by a gyroscopic sensor and an actuator position sensed by a Hall sensor, and an actuator is driven based on the generated driving signal, and wherein in a frequency response measurement mode of the camera module, an actuator position value signal sensed by the Hall sensor is preprocessed and output to a measurement equipment, a target position value, the actuator position value signal, a disturbance signal supplied from the measurement equipment are subjected to arithmetic processing to output an error value signal to the measurement equipment, and an actuator driving signal that compensates for the error value signal is generated to drive the actuator based on the generated actuator driving signal.

The controller of camera module according to an embodiment comprises, in the frequency response measurement mode of the camera module, an amplification unit configured to amplify a first actuator position value signal supplied from the Hall sensor to output a second actuator position value signal, and output the second actuator position value signal to the measurement equipment; a selection unit configured to selectively output the second actuator position value signal output from the amplification unit and a first disturbance signal supplied from the measurement equipment; an analog-to-digital converter configured to convert the second actuator position value signal output from the selection unit into a third actuator position value signal, which is a digital signal, to output the converted third actuator position value signal, and convert the first disturbance signal into a second disturbance signal, which is a digital signal, to output the second disturbance signal; a signal processor configured to subtract the third actuator position value signal and the second disturbance signal from a first target position value to output a first error value signal, and generate a first control signal for compensating for a first error value signal to output the generated first control signal; a digital-to-analog converter configured to convert the first error value signal output from the signal processor into a second error value signal, which is an analog signal, to output the converted second error value signal to the measurement equipment; and a driver configured to generate a first actuator driving signal according to the first control signal output from the signal processor to output the generated first actuator driving signal to the actuator.

In the controller of camera module according to an embodiment, in the driving mode, the amplification unit amplifies the third actuator position value signal supplied from the Hall sensor to output a fourth actuator position value signal, the analog-to-digital converter converts the fourth actuator position value signal supplied through the selection unit into a fifth actuator position value signal, which is a digital signal, to output the converted fifth actuator position value signal, the signal processor calculates the second error value signal by subtracting the fifth actuator position value signal from a second target position value, generates a second control signal for compensating for the calculated second error value signal to output the generated second control signal, and the driver generates a second actuator driving signal according to the second control signal to output the generated second actuator driving signal to the actuator.

A device for measuring a frequency response of a camera module according to an embodiment comprises: an actuator coupled to a lens module or an image sensor module to move the lens module or the image sensor module; a Hall sensor configured to sense an actuator position within the actuator; a gyroscopic sensor configured to sense an angle change of the camera module; an optical image stabilization (OIS) controller configured to generate a driving signal compensating for a difference between the target position using the angle change of the camera module sensed by the gyroscopic sensor and the actuator position sensed by the Hall sensor to drive the actuator based on the generated driving signal in the driving mode; and a measurement equipment connected to the OIS controller in a frequency response measurement mode of the camera module, wherein in a frequency response measurement mode of the camera module, an actuator position value signal sensed by the Hall sensor is preprocessed and output to the measurement equipment, a target position value, the actuator position value signal, a disturbance signal supplied from the measurement equipment are subjected to arithmetic processing to output an error value signal to the measurement equipment, and an actuator driving signal that compensates for the error value signal is generated to drive the actuator based on the generated actuator driving signal.

A method for measuring a frequency response of a camera module according to an embodiment comprises: a first step of connecting an OIS controller of the camera module and a measurement equipment in a frequency response measurement mode of the camera module, and moving an actuator coupled to a lens module or an image sensor module by the OIS controller to a target position; a second step of preprocessing an actuator position value signal sensed by a Hall sensor of the actuator in the OIS controller and outputting the sensed actuator position value signal to the measurement equipment; a third step of outputting an error value signal to the measurement equipment by arithmetic processing a target position value, the actuator position value signal, and a disturbance signal supplied from the measurement equipment; and a fourth step of generating an actuator driving signal that compensates for the error value signal to drive the actuator.

The second step comprises: in the OIS controller, amplifying a first actuator position value signal supplied from the Hall sensor to output a second actuator position value signal, and outputting the second actuator position value signal to the measurement equipment.

The third step comprises: selecting the second actuator position value signal by the OIS controller, converting the second actuator position value signal into a third actuator position value signal, which is a digital signal, and outputting the converted third actuator position value signal; selecting a first disturbance signal supplied from the measurement equipment in the OIS controller, converting the first disturbance signal into a second disturbance signal, which is a digital signal, and outputting the converted second disturbance signal; outputting a first error value signal by subtracting the third actuator position value signal and the second disturbance signal from a first target position value in the OIS controller; and converting the first error value signal into a second error value signal, which is an analog signal, in the OIS controller, and outputting the converted second error value signal to the measurement equipment.

The fourth step comprises: PID controlling the first error value signal in the OIS controller to generate and output a first control signal; and generating a first actuator driving signal according to the first control signal in the OIS controller and outputting the generated first actuator driving signal to the actuator.

The measurement equipment is configured: to calculate frequency response characteristic using the first disturbance signal, the second actuator position value signal, and the second error value signal measured for each frequency by the OIS controller, and to set an optimal control coefficient for PID control of the OIS controller using the calculated frequency response characteristic.

In one embodiment, since the OIS controller has a frequency response measurement function, an external FRA measurement board of the related art is unnecessary, thereby simplifying the configuration of the measurement system and measurement method and reducing costs.

In one embodiment, when measuring the frequency response of the camera module, an increase in the size of the OIS controller can be suppressed by time-divisionally using some internal components of the OIS controller.

BRIEF DESCRIPTION OF THE DRAWINGS

FIG. 4 is a flowchart illustrating a method for measuring a frequency response of a camera module according to an embodiment.

DETAILED DESCRIPTION OF EMBODIMENTS

Hereinafter, embodiments of the present invention will be described with reference to the accompanying drawings.

Figure 1:
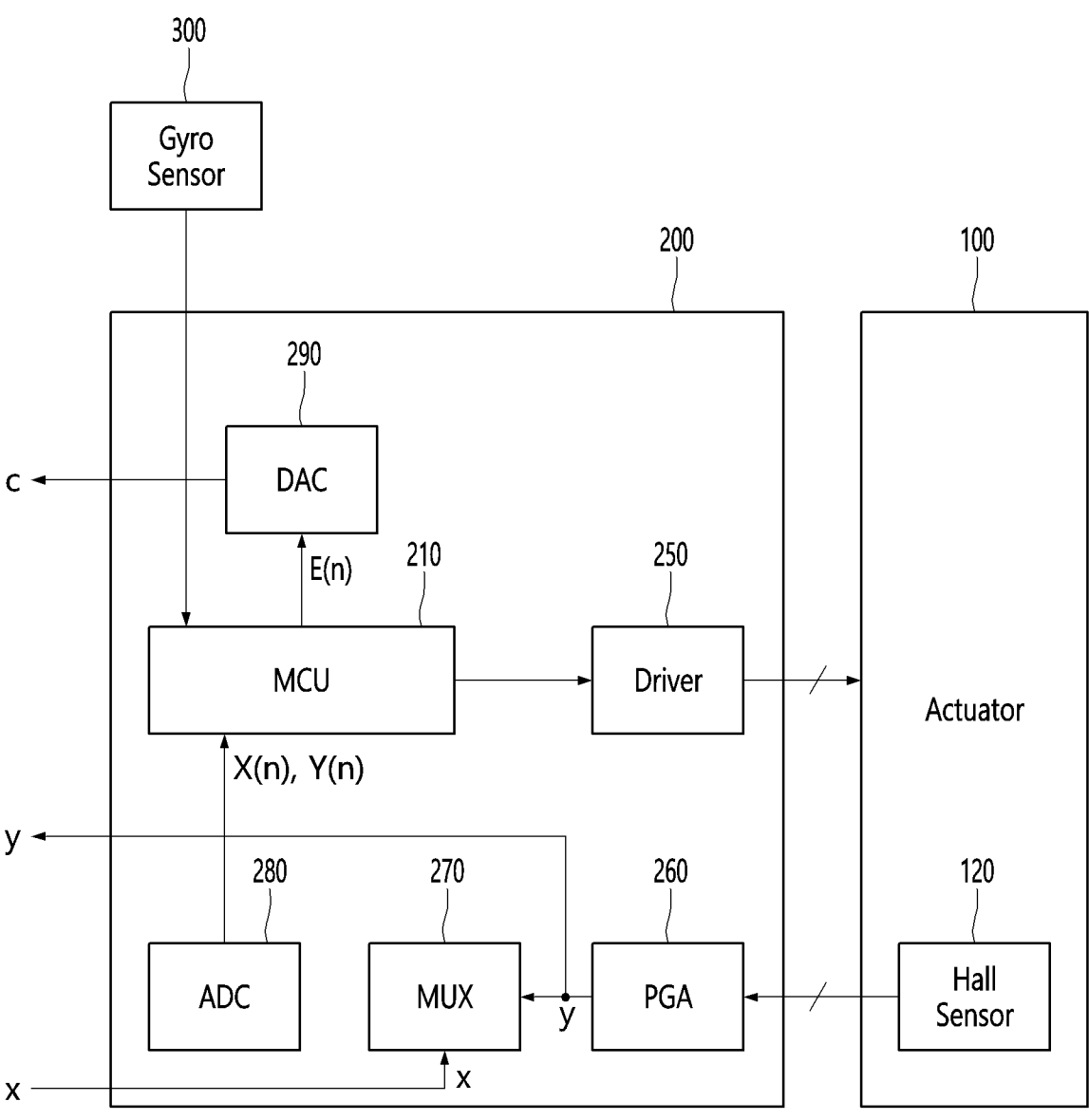
FIG. 1 is a block diagram showing the configuration of a camera module according to an embodiment.
Figure 2:
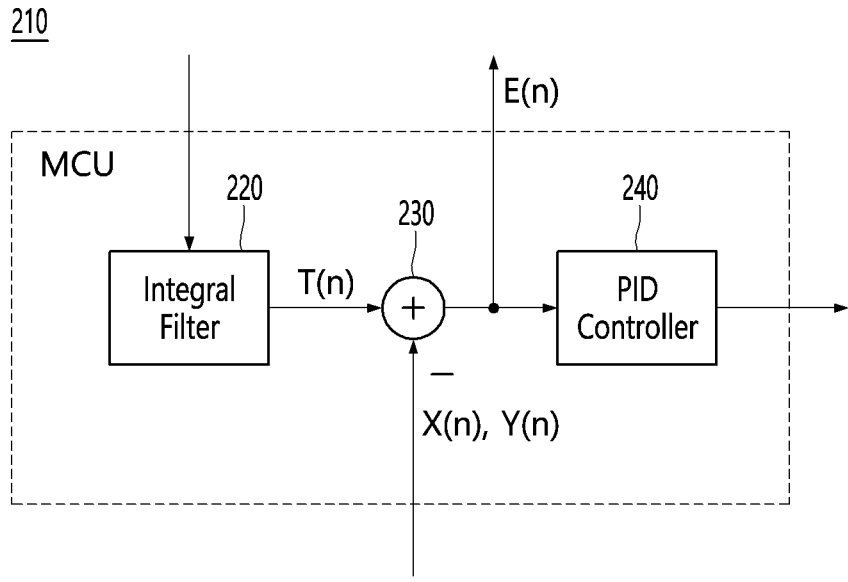
FIG. 2 is a block diagram showing the internal configuration of the MCU shown in FIG. 1.

FIG. 1 is a block diagram showing the configuration of a camera module according to an embodiment of the present invention, and FIG. 2 is a block diagram showing the functional internal configuration of the MCU shown in FIG.

Referring to FIG. 1, a camera module according to an embodiment includes an actuator 100, an OIS controller 200, and a gyroscopic sensor 300.

The camera module further includes an image sensor module and a lens module (not shown). The image sensor module or lens module can be coupled to the actuator 100 and moved by driving the actuator 100.

The lens module can include a plurality of lenses. The lens module can condense incident light and radiating the condensed light to the sensor surface of the image sensor. The image sensor can separate the incident light reflected from the object and collected through the lens module by R (red)/G (green)/B (blue) color, and can sense the optical signal of each color incident from each pixel. The image sensor can sense an image by converting an optical signal of each color into an electrical signal.

The actuator 100 can be driven according to an actuator driving signal supplied from the OIS controller 200 to move the lens module or the image sensor module. For example, the actuator 100 can generate electromagnetic force between a coil and a magnet to move the lens module or the image sensor module. The actuator driving signal can be a current signal applied to the coil of the actuator 100. The actuator 100 can be any one of various types of actuators such as a voice coil motor (VCM) type, a shape memory alloy (SMA) type, and a ball type.

The actuator 100 can perform an auto focusing (AF) function for focusing by moving the lens module or an image sensor module.

The actuator 100 can perform an OIS function of offsetting the angle change by moving the lens module or the image sensor module based on an angle change of the camera module caused by hand shaking under the control of the OIS controller 200. The OIS function can be expressed as a hand-shake prevention function, a hand-shake compensation function, or a motion compensation function.

The actuator 100 can include a plurality of actuators 100 that move the lens module or the image sensor module in the X-axis, Y-axis, and Z-axis directions, respectively by being driven (or moved) according to the actuator driving signal supplied from the OIS controller 200. The plurality of actuators 100 can be individually supplied with a plurality of actuator driving signals from the OIS controller 200. The Z-axis direction means the optical axis direction of the lens module and the image sensor. The X-axis direction and the Y-axis direction can be defined as first and second directions among horizontal directions orthogonal to the optical axis direction.

The actuator 100 can include a Hall sensor 120 that senses a position of the actuator 100. The position of the actuator 100 can represent a position of the lens module or the image sensor module coupled with the actuator 100. The Hall sensor 120 can sense the position of the actuator 100 and output the sensed position to the OIS controller 200. For example, the Hall sensor 120 can sense the position of the actuator 100 by sensing the strength of the magnetic field of the actuator 100. The Hall sensor 120 can be defined as a position sensor.

The Hall sensor 120 can include a plurality of Hall sensors 120 that individually sense positions of the plurality of actuators 100 moving in the X-axis, Y-axis, and Z-axis directions, respectively.

The gyroscopic sensor 300 can sense an angle change of the camera module due to hand shaking, convert the sensed angle change into angular velocity information, and output the angular velocity information to the OIS controller 200. The gyroscopic sensor 300 can be defined as a motion sensor or an angular velocity sensor.

The OIS controller 200 can move the lens module or the image sensor module in reverse by driving the actuator 100 to offset the angle change of the camera module due to the hand shake sensed through the gyroscopic sensor 300, thereby correcting the hand shake. The OIS controller 200 can be integrated with the driver 250 of the actuator 200 to implement integrated circuit (IC). The OIS controller 200 can be defined as a stabilization controller, an OIS controller and driver or an OIS driver.

The OIS controller 200 includes a programmable gain amplifier (hereinafter referred to as PGA) 260, a multiplexer (hereinafter referred to as MUX) 270, and an analog-to-digital converter (hereinafter referred to as ADC) 280, a microcontroller unit (hereinafter referred to as MCU) 210, a digital-to-analog converter (hereinafter referred to as DAC) 290 and a driver 250.

The OIS controller 200 can have an OIS function and/or a frequency response measurement function.

The PGA 260 can amplify a position value signal y of the actuator 100 sensed by the Hall sensor 120 and output the amplified position value signal y. The PGA 260 can amplify the fine position value signal sensed by the Hall sensor 120 to enable digital signal processing, and output the amplified signal. The PGA 260 can be defined as an amplification unit, a pre-processing unit, or an analog front-end (AFE).

The MUX 270 can select one of the position value signal y of the actuator 100 supplied from the PGA 260 and a disturbance signal x supplied from the outside, and outputs the selected signal to the ADC 280. The MUX 270 can be defined as a selection unit.

In driving, the MUX 270 can select the position value signal y of the actuator 100 amplified through the PGA 260 and output the selected signal to the ADC 280.

Meanwhile, when measuring the frequency response of the camera module, the MUX 210 can sequentially select the disturbance signal x and the position value signal y and output the selected signal to the ADC 280. The disturbance signal x can be an oscillation signal (OSC) supplied from a frequency response analysis (FRA) equipment. The OIS controller 200 can output the position value signal y of the actuator 100 amplified through the PGA 260 to the FRA equipment.

The ADC 280 can convert an analog position value signal y supplied from the MUX 270 into a digital position value data Y(n), and output the digital position value data Y(n) into the MCU 210. The ADC 280 can convert the analog disturbance signal x supplied from the MUX 270 into a digital disturbance value data X(n), and output the digital disturbance value data X(n) to the MCU 210. Hereinafter, the digital position value data Y(n) can be expressed as a position value Y(n), and the digital disturbance value data X(n) can be expressed as a disturbance value X(n).

The MCU 210 can calculates a target position value using the angular velocity information from the gyroscopic sensor 300, calculate an error value E(n) between the calculated target position value and the position value Y(n) supplied from the ADC 280, generate a control signal for correcting the calculated error value E(n), and output the generated control signal to the driver 250. Instead of the MCU 210, a signal processor such as a central processing unit (CPU) or a digital signal processor (DSP) can be used.

The MCU 210 can integrate the angular velocity information supplied from the gyroscopic sensor 300 to calculate the target position value T(n) (FIG. 2). The MCU 210 can calculate an error value E(n), which is a difference between the calculated target position value T(n) and the position value Y(n) supplied from the ADC 280. The MCU 210 can generate a control signal for correcting the calculated error value E(n), that is, offsetting the error value E(n) with zero (0), and output the generated control signal to the driver 250. The target position value T(n) can be expressed as target position value data T(n), and the error value E(n) can be expressed as error value data E(n).

The driver 250 can generate an actuator driving signal according to a control signal supplied from the MCU 210 and drive the actuator 100 using the generated actuator driving signal. The actuator driving signal can be generated as a constant current signal or a pulse width modulation (PWM) signal. The driver 250 can move the lens module or an image sensor module coupled to the actuator 100 by driving the actuator 100 according to the actuator driving signal, thereby correcting hand shake.

Meanwhile, when measuring the frequency response of the camera module, the MCU 210 can sequentially receive the disturbance value X(n) and the position value Y(n) through the ADC 200. The MCU 210 can subtract the disturbance value X(n) and the position value Y(n) from the target position value T (0) to calculate the error value E(n), and output the error value to the DAC 290.

The DAC 290 can convert the digital error value E(n) supplied from the MCU 210 into an analog error value signal e, and output the converted analog error value signal e to the FRA equipment.

Referring to FIG. 2, the MCU 210 can include an integral filter 220, an arithmetic unit 230, and a proportional-integral-differential (hereinafter referred to as a PID) controller 240. The integral filter 220, the arithmetic unit 230, and the PID controller shown in FIG. 2 can be implemented as firmware on the MCU 210 or as hardware of a signal processor.

The integral filter 220 can calculate an angle by integrating the angular velocity information from the gyroscopic sensor 300 and output the calculated angle as a target position value T(n).

The arithmetic unit 230 can calculate an error value E(n) between the target position value T(n) and the position value Y(n) from the ADC 280, and output the error value E(n)).

The PID controller 240 can generate a control signal for compensating the error value E(n) by performing PID control. Here, the PID control is performed by amplifying the error value E(n), integrating the amplified error value E(n) to reduce the deviation from the normal state, and suppressing rapid changes such as overshoot/undershoot by differentiating the amplified error value E(n). The PID controller 240 can perform PID control by applying the proportional control coefficient, integral control coefficient, and differential control coefficient set in the internal memory to the error value E(n).

Meanwhile, when measuring the frequency response of the camera module, the arithmetic unit 230 subtracts the disturbance value X(n) and the position value Y(n) from the target position value T(0) to calculate an error value E(n), and output the calculated error value E(n) to the PID controller 240 and the DAC 290.

The camera module according to an embodiment can connect the FRA equipment to the OIS controller 200 in the inspection step to measure the frequency response characteristic of the camera module. The FRA equipment can set an optimal control coefficient (proportional control coefficient, integral control coefficient, differential control coefficient) of the PID controller 240 using the frequency response analysis result.

The OIS controller 200 according to an embodiment can simplify a measurement system and a measurement method by having a frequency response measurement function.

The OIS controller 200 according to an embodiment can suppress an increase in size of the OIS controller 200 by using internal components (MUX, ADC, MCU) in a time-division manner when measuring a frequency response.

Hereinafter, a system and method for measuring a frequency response of a camera module according to an exemplary embodiment will be described in detail with reference to FIGS. 3 to 6.

Figure 3:
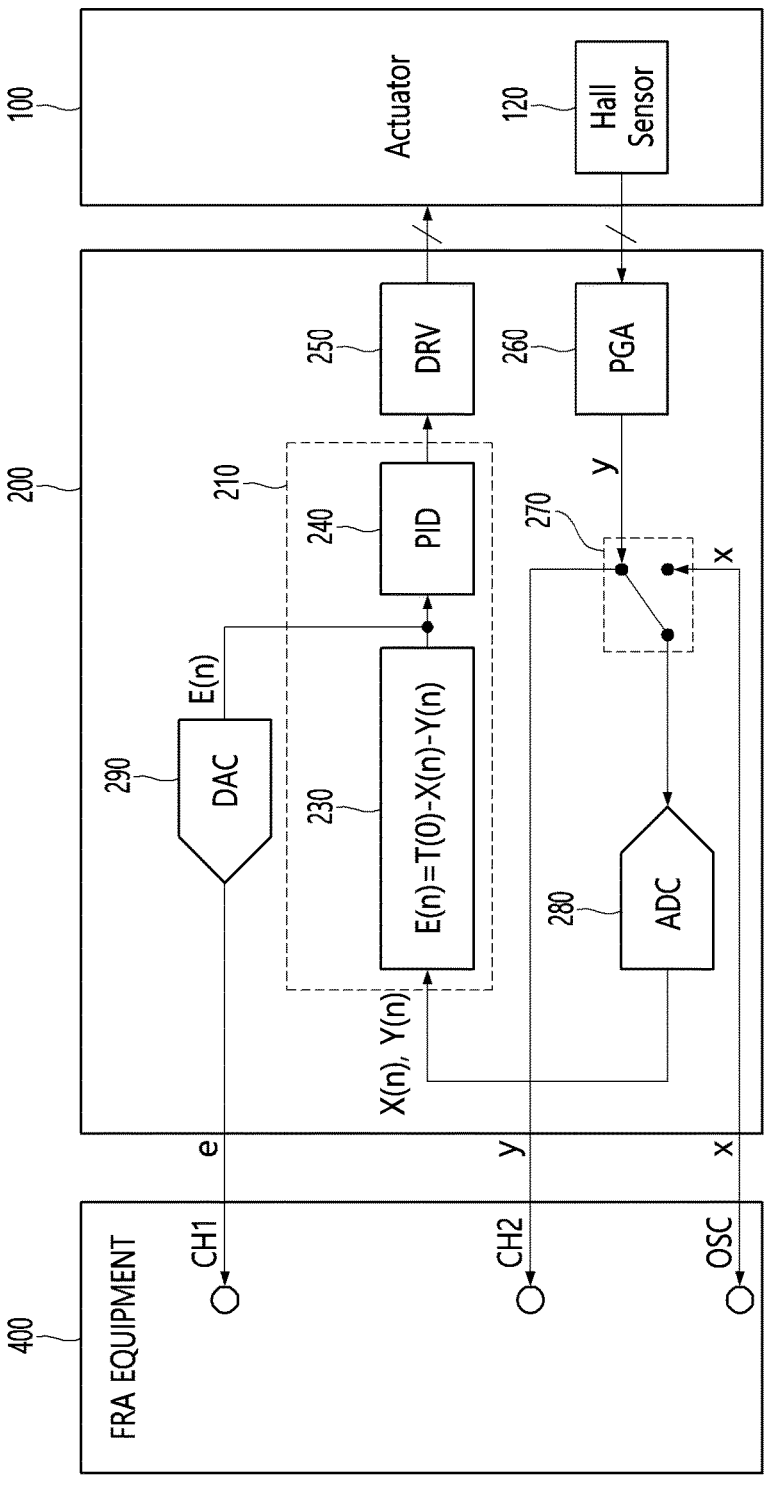
FIG. 3 is a block diagram showing the configuration of a device for measuring a frequency response of a camera module according to an embodiment.

FIG. 3 is a block diagram showing a configuration of a device for measuring a frequency response of a camera module according to an embodiment, and FIG. 4 is a flowchart illustrating a method for measuring a frequency response of a camera module according to an embodiment.

Referring to FIG. 3, a system for measuring a frequency response of a camera module according to an embodiment can include a camera module and an FRA equipment 400. The camera module can include an actuator 100 and an OIS controller 200. The FRA equipment 400 can be connected to the controller 200.

Referring to FIGS. 3 and 4, the FRA equipment 400 and the OIS controller 200 are connected, and the FRA equipment 400 and the OIS controller 200 are initially set to measure the frequency response of the camera module (S402).

In step S402 the FRA equipment 400 can set the sampling number Tn per frequency of the disturbance signal x of the OIS controller 200 to a specific value REF, and set the step-by-step frequency increment of the disturbance signal x of the FRA equipment 400. The FRA equipment 400 can generate an oscillation signal OSC of a specific frequency and apply the oscillation signal OSC to the OIS controller 200 as a disturbance signal x. The OIS controller 200 can drive the actuator 100 to move the actuator 100 to the target position T(0). The OIS controller 200 can move the actuator 100 by driving the actuator 100 according to the disturbance signal x.

The OIS controller 200 can amplify the position value signal y of the actuator 100 output from the Hall sensor 120 of the actuator 100 and output the position value signal y to the channel CH2 of the FRA equipment 400, and the FRA The equipment 400 can convert the position value signal y of the actuator 100 into a digital position value Y(n) (S406).

In step S406, the OIS controller 200 can amplify the position value signal y of the actuator 100 output from the Hall sensor 120 through the PGA 260, and output the position value signal y to the channel CH2 of the FRA equipment 400. Accordingly, the FRA equipment 400 can measure the position value signal y of the actuator 100 through the PGA 260 of the OIS controller 200.

In step S406, the OIS controller 200 outputs the position value signal y of the actuator 100 amplified through the PGA 260 to the ADC 280 through the MUX 270, convert the position value signal y of the actuator 100 into a digital position value Y(n) through the ADC 280, and output the converted digital position value Y(n) to the MCU 210.

The OIS controller 200 can output the disturbance signal x output from the FRA equipment 400 to the ADC 280 through the MUX 270, convert the disturbance signal x through the ADC 280 to a digital disturbance value X(n), and output the converted digital disturbance value X(n) to the MCU 210 (S408).

The OIS controller 200 can subtract the position value Y(n) and the disturbance value X(n) from the target position value T(0) through the arithmetic unit 230 of the MCU 210 to calculate an error value E(n) (S410).

The OIS controller 200 can convert the calculated error value E(n) into an analog error value signal e through the DAC 290, and output the converted analog error value signal e the channel CH1 of the FRA equipment 400 (S412). Accordingly, the FRA equipment 400 can measure an error value signal e through signal processing of the PGA 260, the MUX 270, the ADC 280, the arithmetic unit 230, and the DAC 290 of the OIS controller 200.

The OIS controller 200 can generate a control signal corresponding to the error value E(n) through the PID controller 240 of the MCU 210, and generate an actuator driving signal according to the control signal through a driver (DRV) 250, and drive the actuator 100 using the generated actuator driving signal (S414).

The OIS controller 200 can gradually increase (n=n+1) the sampling number Tn until the sampling number Tn of the ADC 280 reaches a specific value REF (S416, S418), while performing steps S406, S408, S410, S414, S416, and S418 can be repeated. Accordingly, the OIS controller 200 can measure the position value signal y and the error value signal e of the actuator 100 at each sampling point of the disturbance signal x having a specific frequency, and output the measured position value signal y and the error value signal e of the actuator 100 to the FRA equipment 400.

Figure 5:
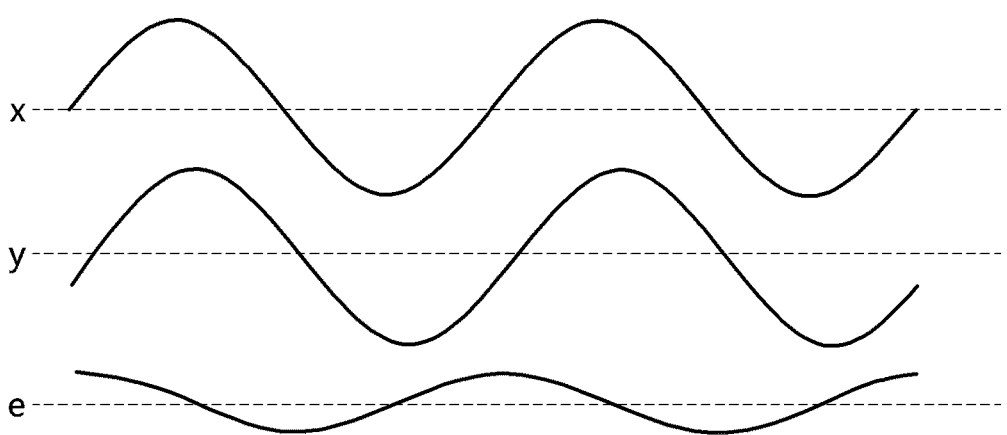
FIG. 5 is an exemplary diagram showing input and output signal waveforms between the FRA equipment and the OIS controller shown in FIG. 3.

FIG. 5 is a diagram showing input/output signal waveforms between the FRA equipment and the OIS controller shown in FIG. 3 by way of example.

Referring to FIG. 5, each of a disturbance signal x of a specific frequency and a position value signal y of the actuator 100 can have a sine wave shape. An error value signal e obtained by subtracting the disturbance signal x and the position value signal y from the target position value can have a variable shape according to the disturbance signal x and the position value signal y.

When the sampling number Tn of the OIS controller 200 is completed up to the set specific value REF (S416, Yes), the FRA equipment 400 can increase a frequency of the disturbance signal x to output the increased disturbance signal x to the OIS controller 200 (S404).

The OIS controller 200 can receive the frequency-increased disturbance signal x and repeat steps S406, S408, S410, S414, S416, and S418 described above. Accordingly, the OIS controller 200 can measures the position value signal y and the error value signal e of the actuator 100 at each sampling point of the disturbance signal x for each frequency while increasing the frequency of the disturbance signal x. the OIS controller 200 can output the measured position value signal y and the error value signal e of the actuator 100 to the FRA equipment 400.

The FRA equipment 400 can measure and analyze gain and phase, which are frequency response characteristic of the camera module by using the disturbance signal x, the position value signal y of the actuator 100, and the error value signal e. The disturbance signal x can be an input signal of the OIS controller 200. The position value signal y of the actuator 100 can be supplied through the OIS controller 200 as an output of the Hall sensor 120 of the actuator 100. The error value signal e can be an output signal of the OIS controller 200. The FRA equipment 400 can measure and analyze the frequency response characteristic of the camera module for each frequency while increasing the frequency of the OSC signal.

Figure 6:
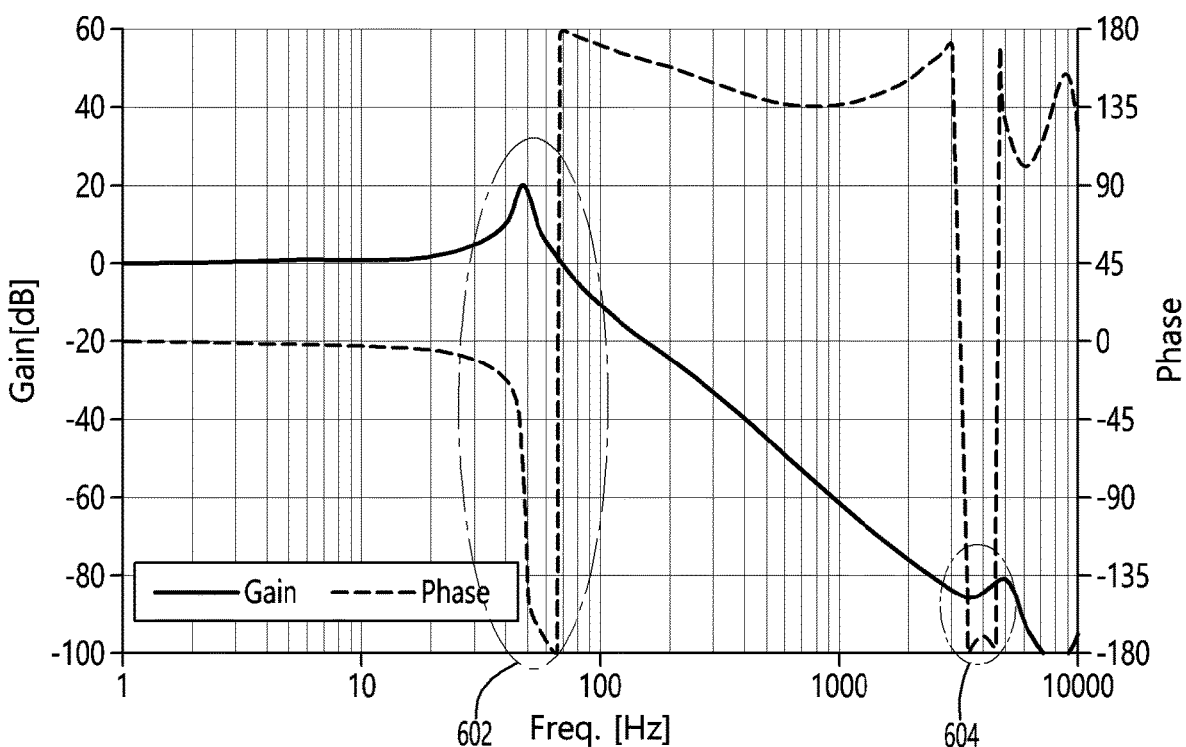
FIG. 6 is a graph illustrating a relationship between a frequency and a gain/phase of a disturbance signal measured by a device for measuring a frequency response of a camera module according to an embodiment.

FIG. 6 is a graph illustrating a relationship between a frequency and a gain/phase of a disturbance signal measured by a device for measuring a frequency response of a camera module according to an embodiment.

Referring to FIG. 6, the FRA equipment 400 can measure gain change according to frequency, phase change according to frequency, etc. that represents the frequency response characteristic of the camera module by using the position value signal y and the error value signal e of the actuator 100 measured through the OIS controller 200, while increasing the frequency of the disturbance signal x.

The FRA equipment 400 can measure the frequency response characteristic of the camera module and detect frequency bands 602 and 604 in which the gain or phase changes rapidly by using self-oscillation of at least one of the actuator 100 and the OIS controller 200. The FRA equipment 400 can set the optimal control coefficient (proportional control coefficient, integral control coefficient, differential control coefficient) of the PID controller 240 to decrease or offset at a portion where the gain or phase changes rapidly.

As such, in the camera module according to an embodiment, since the OIS controller 200 has a frequency response measurement function, an external FRA measurement board of the related art is unnecessary. Thus, the configuration and measurement method of the measurement system can be simplified and the cost can be reduced.

The camera module according to an embodiment can suppress an increase in the size of the OIS controller by time-divisionally using the internal configuration (MUX, ADC, MCU) of the OIS controller when measuring the frequency response.

Those skilled in the art to which the present invention pertains will be able to understand that the above-described present invention can be embodied in other specific forms without changing its technical spirit or essential features.

Therefore, it should be understood that the embodiments described above are illustrative in all respects and not limiting. The scope of the present invention is indicated by the following claims rather than the detailed description above, and all changes or modifications derived from the meaning and scope of the claims and equivalent concepts should be construed as being included in the scope of the present invention.

What is claimed is:

1. A controller of camera module,
wherein in a driving mode, a driving signal is generated to compensate for a difference between a target position using an angle change of the camera module sensed by a gyroscopic sensor and an actuator position sensed by a Hall sensor, and an actuator is driven based on the generated driving signal, and
wherein in a frequency response measurement mode of the camera module, an actuator position value signal sensed by the Hall sensor is preprocessed and output to a measurement equipment, a target position value, the actuator position value signal, and a disturbance signal supplied from the measurement equipment are subjected to arithmetic processing to output an error value signal to the measurement equipment, and an actuator driving signal that compensates for the error value signal is generated to drive the actuator based on the generated actuator driving signal.

2. The controller of camera module of claim 1, wherein in the frequency response measurement mode of the camera module, the controller comprises:
an amplification unit configured to amplify a first actuator position value signal supplied from the Hall sensor to output a second actuator position value signal, and output the second actuator position value signal to the measurement equipment;
a selection unit configured to selectively output the second actuator position value signal output from the amplification unit and a first disturbance signal supplied from the measurement equipment;
an analog-to-digital converter configured to convert the second actuator position value signal output from the selection unit into a third actuator position value signal, which is a digital signal, to output the converted third actuator position value signal, and convert the first disturbance signal into a second disturbance signal, which is a digital signal, to output the second disturbance signal;
a signal processor configured to subtract the third actuator position value signal and the second disturbance signal from a first target position value to output a first error value signal, and generate a first control signal for compensating for the first error value signal to output the generated first control signal;
a digital-to-analog converter configured to convert the first error value signal output from the signal processor into a second error value signal, which is an analog signal, to output the converted second error value signal to the measurement equipment; and
a driver configured to generate a first actuator driving signal according to the first control signal output from the signal processor to output the generated first actuator driving signal to the actuator.

3. The controller of camera module of claim 2, wherein in the driving mode, the amplification unit amplifies the third actuator position value signal supplied from the Hall sensor to output a fourth actuator position value signal, the analog-to-digital converter converts the fourth actuator position value signal supplied through the selection unit into a fifth actuator position value signal, which is a digital signal, to output the converted fifth actuator position value signal, the signal processor calculates the second error value signal by subtracting the fifth actuator position value signal from a second target position value, generates a second control signal for compensating for the calculated second error value signal to output the generated second control signal, and the driver generates a second actuator driving signal according to the second control signal to output the generated second actuator driving signal to the actuator.

4. The controller of camera module of claim 3, wherein in the driving mode, the signal processor includes:

an integral filter configured to integrate angular velocity information obtained by sensing an angle change of the camera module by the gyroscopic sensor to output the integrated angular velocity information as the second target position value;

an arithmetic unit configured to calculate the second error value signal by subtracting the second target position value from the fifth actuator position value signal; and a proportional-integral-derivative (PID) controller configured to PID control the second error value signal output from the arithmetic unit to generate the second control signal.

5. The controller of camera module of claim 4, wherein in the frequency response measurement mode of the camera module, the arithmetic unit outputs the first error value signal by subtracting the third actuator position value signal and the second disturbance signal from the first target position value, and the PID controller PID controls the first error value signal output from the arithmetic unit.

6. The controller of camera module of claim 5, wherein frequency of the first disturbance signal supplied from the measurement equipment is varied.

7. A device for measuring a frequency response of a camera module, comprising:

an actuator coupled to a lens module or an image sensor module to move the lens module or the image sensor module;

a Hall sensor configured to sense an actuator position within the actuator;

a gyroscopic sensor configured to sense an angle change of the camera module;

an optical image stabilization (OIS) controller configured to generate a driving signal compensating for a difference between a target position using the angle change of the camera module sensed by the gyroscopic sensor and the actuator position sensed by the Hall sensor to drive the actuator based on the generated driving signal in the driving mode; and a measurement equipment connected to the OIS controller in a frequency response measurement mode of the camera module, wherein in the frequency response measurement mode of the camera module, an actuator position value signal sensed by the Hall sensor is preprocessed and output to the measurement equipment, a target position value, the actuator position value signal, and a disturbance signal supplied from the measurement equipment are subjected to arithmetic processing to output an error value signal to the measurement equipment, and an actuator driving signal that compensates for the error value signal is generated to drive the actuator based on the generated actuator driving signal.

8. The device of claim 7, wherein in the frequency response measurement mode of the camera module, the OIS controller comprises:

an amplification unit configured to amplify a first actuator position value signal supplied from the Hall sensor to output a second actuator position value signal, and output the second actuator position value signal to the measurement equipment;

a selection unit configured to selectively output the second actuator position value signal output from the amplification unit and a first disturbance signal supplied from the measurement equipment;

an analog-to-digital converter configured to convert the second actuator position value signal output from the selection unit into a third actuator position value signal, which is a digital signal, to output the converted third actuator position value signal, and convert the first disturbance signal into a second disturbance signal, which is a digital signal, to output the second disturbance signal;

a signal processor configured to subtract the third actuator position value signal and the second disturbance signal from a first target position value to output a first error value signal, and generate a first control signal for compensating for the first error value signal to output the generated first control signal;

a digital-to-analog converter configured to convert the first error value signal output from the signal processor into a second error value signal, which is an analog signal, to output the converted second error value signal to the measurement equipment; and a driver configured to generate a first actuator driving signal according to the first control signal output from the signal processor to output the generated first actuator driving signal to the actuator.

9. The device of claim 8, wherein in the frequency response measurement mode of the camera module, the signal processor comprises:

an arithmetic unit configured to calculate the first error value signal by subtracting the third actuator position value signal and the second disturbance signal from the first target position value; and a proportional-integral-derivative (PID) controller configured to PID control the calculated first error value signal to generate the first control signal.

10. The device of claim 9, wherein the measurement equipment is configured:

to calculate frequency response characteristic using the first disturbance signal, the second actuator position value signal, and the second error value signal measured for each frequency through the OIS controller while varying a frequency of the first disturbance signal, and to set an optimal control coefficient of the PID controller using the calculated frequency response characteristic.

11. A method for measuring a frequency response of a camera module, comprising:

a first step of connecting an OIS controller of the camera module and a measurement equipment in a frequency response measurement mode of the camera module, and moving an actuator coupled to a lens module or an image sensor module by the OIS controller to a target position;

a second step of pre-processing an actuator position value signal sensed by a Hall sensor of the actuator in the OIS controller and outputting the sensed actuator position value signal to the measurement equipment;

a third step of outputting an error value signal to the measurement equipment by arithmetic processing a target position value, the actuator position value signal, and a disturbance signal supplied from the measurement equipment; and a fourth step of generating an actuator driving signal that compensates for the error value signal to drive the actuator.

12. The method of claim 11, wherein the second step comprises:

in the OIS controller, amplifying a first actuator position value signal supplied from the Hall sensor to output a second actuator position value signal, and outputting the second actuator position value signal to the measurement equipment.

13. The method of claim 11, wherein the third step comprises:

selecting a second actuator position value signal by the OIS controller, converting the second actuator position value signal into a third actuator position value signal, which is a digital signal, and outputting the converted third actuator position value signal;

selecting a first disturbance signal supplied from the measurement equipment in the OIS controller, converting the first disturbance signal into a second disturbance signal, which is a digital signal, and outputting the converted second disturbance signal;

outputting a first error value signal by subtracting the third actuator position value signal and the second disturbance signal from a first target position value in the OIS controller; and converting the first error value signal into a second error value signal, which is an analog signal, in the OIS controller, and outputting the converted second error value signal to the measurement equipment.

14. The method of claim 11, wherein the fourth step comprises:

PID controlling a first error value signal in the OIS controller to generate and output a first control signal; and generating a first actuator driving signal according to the first control signal in the OIS controller and outputting the generated first actuator driving signal to the actuator.

15. The method of claim 11, further comprising:

a fifth step of repeating the second to fourth steps while increasing the sampling number of a first disturbance signal until the sampling number reaches a set value in the OIS controller.

16. The method of claim 15, further comprising:

a sixth step of varying a frequency of the first disturbance signal in the measurement equipment when the sampling number of the first disturbance signal in the OIS controller reaches the set value; and a seventh step of repeating the first to fifth steps in the OIS controller.

17. The method of claim 15, wherein the measurement equipment is configured:

to calculate frequency response characteristic using the first disturbance signal, a second actuator position value signal, and a second error value signal measured for each frequency by the OIS controller, and to set an optimal control coefficient for PID control of the OIS controller using the calculated frequency response characteristic.

* * * * *